(12) United States Patent
Marchetti

(10) Patent No.: US 7,782,224 B2
(45) Date of Patent: Aug. 24, 2010

(54) CUSTOMIZABLE INDICATOR LIGHT

(75) Inventor: Michael W. Marchetti, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 312 days.

(21) Appl. No.: 12/119,584

(22) Filed: May 13, 2008

(65) Prior Publication Data

US 2009/0284387 A1    Nov. 19, 2009

(51) Int. Cl.
*G08B 5/22* (2006.01)
*G09F 9/33* (2006.01)
(52) U.S. Cl. ............................. 340/815.45; 340/815.4; 340/815.69
(58) Field of Classification Search ............ 340/815.45, 340/815.4, 815.69
See application file for complete search history.

(56) References Cited

U.S. PATENT DOCUMENTS

2005/0212684 A1*  9/2005  Huang .................. 340/815.45

* cited by examiner

*Primary Examiner*—Travis R Hunnings
(74) *Attorney, Agent, or Firm*—Carter, DeLuca, Farrell & Schmidt, LLP

(57) ABSTRACT

A customizable indicator light system for a printing device includes at least one printing device configured to detect at least one machine state corresponding to the operation of the at least one printing device. An indicator light is operably coupled to the at least one printing device. The indicator light is adapted to operate in at least one of an off state, a blink state, and a steady state to indicate the detected machine state. A computing device is in operative communication with the at least one printing device and is adapted to provide at least one user setting to the at least one printing device. The at least one user setting includes at least one behavior setting configured to selectively set the indicator light to one of the off state, the blink state, and the steady state based on the detected machine state. The at least one user setting further includes a skip setting configured to cause the indicator light to remain set in at least one of the off state, the blink state, and the steady state based on the detected machine state.

20 Claims, 2 Drawing Sheets

CUSTOMIZABLE INDICATOR LIGHT

BACKGROUND

1. Technical Field

The present disclosure relates to a printing device system and method and, in particular, to a system and method for customizing an indicator light of a printing device.

2. Description of Related Art

In the competitive consumer market for printing devices, it is of particular importance that a printing device be user-friendly. The ability of a printing device to provide customizable features and print functions can drastically affect customer satisfaction.

Commercially available printing devices typically include one or more monochromatic indicator lights configured to visually indicate to the user the current status or machine state of the printing device. Printing devices may further include indicator lights that are multi-color to enhance the indication function of the indicator light. Typically, indicator lights include three possible states, namely, "off" (e.g., to indicate the printing device is operating properly), "steady" (e.g., indicating that operator intervention is required), and "blinking" (e.g., indicating that immediate or urgent operator intervention is required). However, users of the printing device may desire to customize the behavior of printing device functions such as indicator light behavior based on personal preference.

SUMMARY

In an embodiment of the present disclosure, a customizable indicator light system for a printing device includes at least one printing device configured to detect at least one machine state corresponding to the operation of the at least one printing device. An indicator light is operably coupled to the at least one printing device. The indicator light is adapted to operate in at least one of an off state, a blink state, and a steady state to indicate the detected machine state. A computing device is in operative communication with the at least one printing device and is adapted to provide at least one user setting to the at least one printing device. The at least one user setting includes at least one behavior setting configured to selectively set the indicator light to one of the off state, the blink state, and the steady state based on the detected machine state. The at least one user setting further includes a skip setting configured to cause the indicator light to remain set in at least one of the off state, the blink state, and the steady state based on the detected machine state.

According to another embodiment of the present disclosure, a customizable indicator light system for a printing device includes at least one printing device configured to detect at least one machine state corresponding to the operation of the at least one printing device. An indicator light is operably coupled to the at least one printing device. The indicator light is adapted to operate in at least one of an off state, a blink state, and a steady state to indicate the detected machine state. A computing device is in operative communication with the at least one printing device and is adapted to provide at least one user setting to the at least one printing device. The at least one user setting includes at least one behavior setting configured to selectively set the indicator light to one of the off state, the blink state, and the steady state based on the detected machine state. The at least one user setting further includes a skip setting configured to cause the indicator light to remain set in at least one of the off state, the blink state, and the steady state based on the detected machine state. At least one system default setting is stored in the printing device and is adapted to change the state of operation of the indicator light based on the detected machine state. The at least one user setting is configured to selectively override the at least one system default setting.

The present disclosure also provides for a method for customizing indicator light behavior of a printing system. The method includes generating at least one user setting having at least one behavior setting and a skip setting to at least one printing device. The method further includes detecting at least one machine state of the at least one printing device and setting an indicator light to one of an off state, a blink state, and a steady state based on the detected machine state in accordance with the at least one behavior setting. The method further includes repeating the detecting step based on the detected machine state in accordance with the skip setting.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
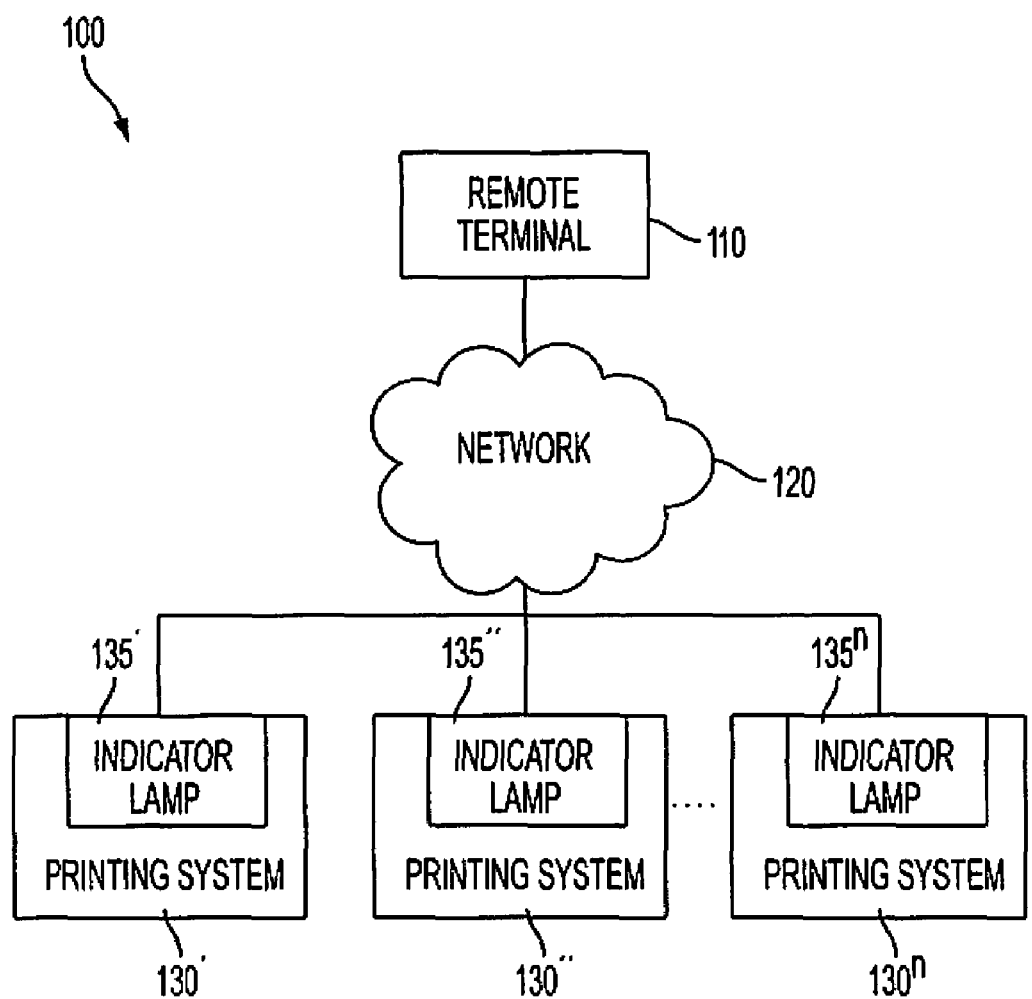
FIG. 1 shows a system for customizing an indicator light of a printing device in accordance with the present disclosure.

The system and method of the present disclosure allows the user of a printing device to create one or more user settings to customize indicator light behavior. The indicator light includes three possible states of operation, namely, OFF (e.g., not illuminated), STEADY (e.g., constant illumination), and BLINK (e.g., intermittent illumination), any of which may be set by the user to customize indicator light behavior in accordance with the detection of any one or more machine states (e.g., operation status) of a printing device.

In embodiments, machine states may include OFF, STOPPED/FAULTED (e.g., system unable to print due to fault condition), NEEDS ATTENTION (e.g., attention needed soon to continue uninterrupted production), INFORMATIONAL (e.g., informational message exists), PRINTING (e.g., system is printing a job), IDLE (e.g., no active print jobs in system), and DEFAULT (e.g., any other state not included hereinabove). Other machine states may be included and the above list should not be construed as exhaustive.

User settings may be made by the user manually through interaction with a graphical user interface (GUI) local to the printing device and/or remotely over a network (e.g., via a print server) using a remote terminal (e.g., a computing device). The customization of the indicator light operation in accordance with user settings, allows the user to personalize their use of the one or more printing devices to suit their preferences with regard to printing device status. User settings may be stored in the memory of the printing device itself and/or in a memory of a networked computing device such as, for example, a print server. The memory of a printing device or a corresponding print server may store system default settings (e.g., set by the manufacturer) that dictate the default operation of the indicator light of a printing device. Customized user settings may be used to override any one or more system default settings of a given printing device. Each system default setting that is not overridden by a customized user setting remains defined for the machine state to which the setting is assigned by default. Additionally, any one or more settings corresponding to indicator light operation may be reset by the user to return to system default settings. Throughout this description, the term "user setting" is defined as either a user setting utilized to override a system default setting and/or the system default setting itself. User settings may include OFF, STEADY, and BLINK settings configured to change the state of operation of the indicator light between OFF, STEADY, and BLINK, respectively, and a SKIP setting (e.g., do not change indicator light operation upon detection of corresponding machine state) wherein the state of operation of the indicator light is unchanged for the currently detected machine state of the printing device.

The system monitors the current machine state of a printing device included in the system and based on the detected machine state, activates the indicator light of the printing device in accordance with the user setting (e.g., OFF, BLINK, STEADY) corresponding with the detected machine state. If the user setting corresponding to the current machine state is set to any one of OFF, STEADY, or BLINK, the indicator light will be activated accordingly. If the user setting corresponding to the current machine state is set to SKIP, indicator light behavior is unchanged and the system continues to monitor the current machine state of the printing device. In this manner, indicator light behavior is not altered from its previous behavior unless a machine state is detected in which the corresponding user setting is set to OFF, BLINK, or STEADY. This functionality is critical to ensure proper indicator light behavior upon the detection of multiple machine states. By way of example, a printing device may be in the NEEDS ATTENTION machine state and/or the INFORMATIONAL machine state concurrently with the PRINTING or IDLE machine state. In this scenario, setting the NEEDS ATTENTION machine state and/or the INFORMATIONAL machine state to SKIP allows indicator light behavior to be dictated by the user setting corresponding to either the PRINTING machine state and/or the IDLE machine state. That is, if the user setting corresponding to the PRINTING machine state is set to OFF and the machine is currently printing and an INFORMATIONAL machine state and/or NEEDS ATTENTION machine state exists, the indicator light will be OFF in the above example.

FIG. 1 illustrates a system 100, wherein remote terminal 110 is in operative communication with one or more printing devices 130', 130", 130''' (e.g., Xerographic printing devices) over a network 120 (e.g., LAN, WAN, Internet, etc.). The printing devices 130', 130", 130''' may include several components, including a processor, RAM, a hard disk drive, a USB interface, a network interface, a computer display/monitor, a computer mouse, a computer keyboard, and/or other components. The printing devices 130', 130", 130''' of FIG. 1 are illustrative only in that the system 100 of the present disclosure may be adapted to provide networked communication between any one or more printing devices, printing systems, computing devices, or the like. The one or more printing devices 130', 130", 130''' may be arranged in a network configuration such that each one of printing devices 130', 130", 130''' are in operative communication with the other and/or with the remote terminal 110.

Each of the one or more printing devices 130', 130", 130''' includes a corresponding indicator light 135', 135", 135''' that indicates the current status and/or machine state of printing devices 130', 130", 130''', respectively. More specifically, indicator lights 135', 135", 135''' operate to indicate any one or more machine states of printing devices 130', 130", 130''', respectively (e.g., through selective illumination). In embodiments, the indicator light may be a monochromatic LED.

The remote terminal 110 may be any computing device suitable to communicate data over the network 120. In embodiments, the remote terminal 110 may include several components, including a processor capable of executing software instructions, RAM, a hard disk drive, a USB interface, a network interface, a computer display/monitor, a computer mouse, a computer keyboard, and/or other components. Remote terminal 110 may also include a suitable software application adapted to provide a user interface to facilitate generating and communicating user settings to any one or more of printing devices 130', 130", 130''' over the network 120. The user settings are processed by the printing device and incorporated to override any one or more system default settings to dictate the behavior of the indicator lights 135', 135", 135''' corresponding to any one or more machine states.

User setting communications may further include the IP address of the remote terminal 110 and/or login information used to access the remote terminal 110 to recall user preferences based on the login information. The remote terminal 110 in turn, provides the user with a list of available user settings for use with the one or more printing devices 130', 130", 130'''. For example, printing devices 130', 130", 130''' may include an onboard database configured to store a list and/or summary of available user settings, a list of system default settings, a list of restricted/unrestricted user settings, a list of preferred user settings based on past uses by a particular user, data related to machine states, system software, etc.

In embodiments, a network administrator may selectively restrict access to any one or more user settings stored in the printing device database based on status parameters of individual users and/or groups of users. For example, it may be advantageous to restrict the user or certain users from overriding certain system default settings with customized user settings to ensure proper indicator light behavior corresponding to particular machine states (e.g., OFF). Access to user settings may be limited by other parameters such as, for example, time of day, day of the week, day of the month, work shift (e.g., a.m., p.m. overnight, etc.).

In embodiments, the system 100 may incorporate RFID functionality to facilitate automatic customization of indicator light behavior based on RFID signals transmitted from a RFID tag or transponder (not explicitly shown) associated with a user (e.g., the transponder may be worn by or affixed to the user). More specifically, any one or more of printing devices 130', 130", 130''' may include an RFID interrogator (not explicitly shown) adapted to receive a signal transmitted from the transponder. The signal may include any information suitable to identify the individual to which the transmitting transponder is associated (e.g., an RFID employee number). Based on the identity of the user, the printing device processor retrieves user setting preferences of that user stored in the printing device memory (e.g., based on prior uses of that particular user) and incorporates the user settings to override and/or complement system default settings for indicator light behavior. Further, the transmitted signal itself may include customized user settings corresponding to the user associated with the transponder from which the signal was transmitted.

Based on user identity transmitted by the transponder, a system administrator may restrict access to any one or more printing devices 130', 130", 130'''. More specifically, identification information such as an RFID code (e.g., a number) transmitted from the transponder is processed by the printing device processor and compared to a database of RFID numbers stored in the memory of the printing device that correspond to users authorized to customize indicator light behavior for that printing device. If the processed RFID number is not detected in the stored list of RFID numbers, access to the user settings of the printing device is restricted to the user associated with the processed RFID number.

Figure 2:
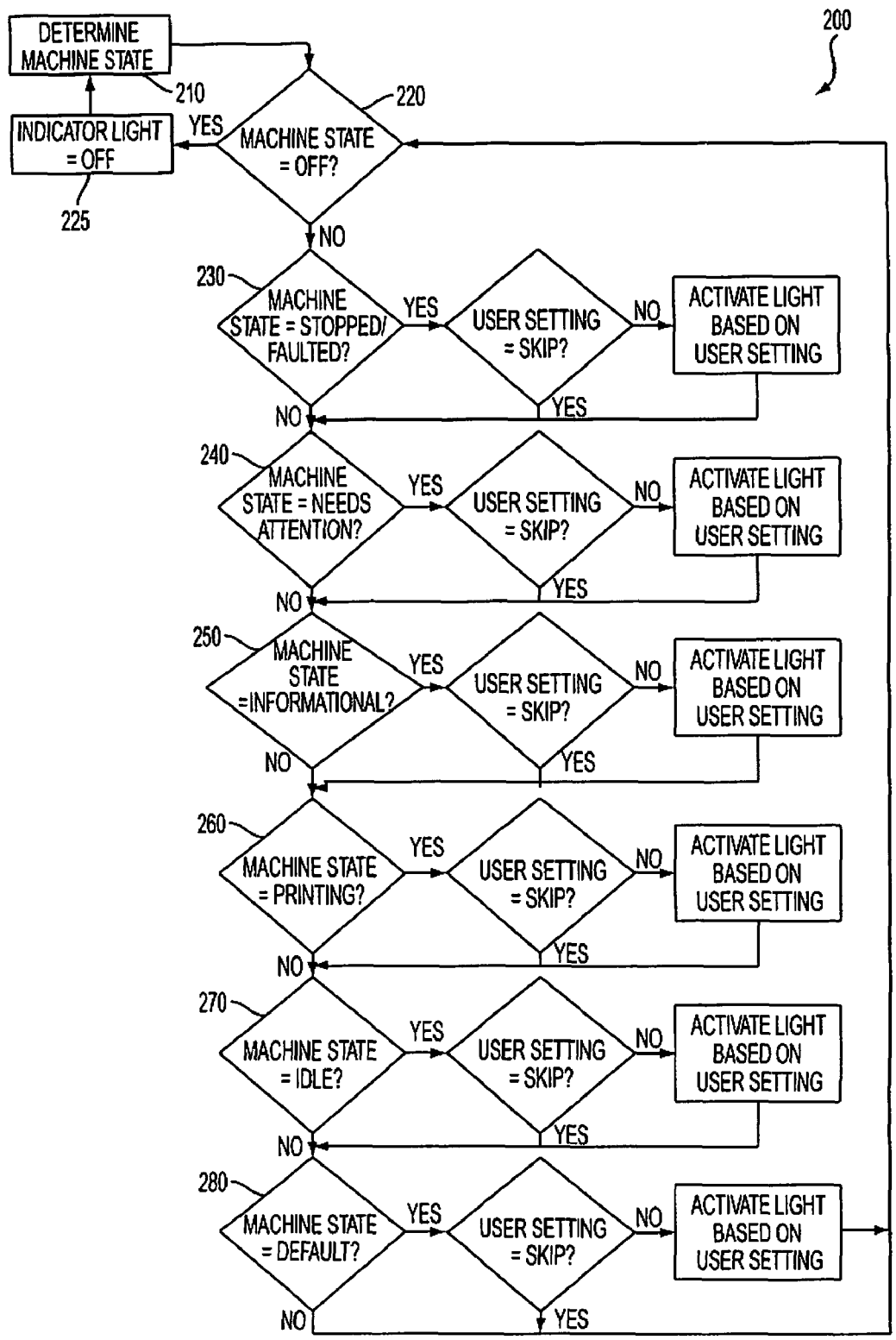
FIG. 2 shows a flow chart diagram illustrating a method for customizing indicator light behavior of a printing system in accordance with the present disclosure.

FIG. 2 shows a flow diagram illustrating an algorithm 200 for customizing an indicator light of a printing device in accordance with the present disclosure. In embodiments, the algorithm 200 may be a software application residing in the memory of the printing device and executable by the processor of the printing device. The algorithm 200 is utilized by the one or more printing devices 130', 130", 130" to operate the corresponding indicator light 135', 135", 135" based on one or more user settings. In the illustrated embodiment, the order in which the algorithm 200 detects machine states is based on priority of each machine state relative to other machine states. That is, each step or query of the algorithm 200 is higher priority than the subsequent step or query to ensure the algorithm 200 operates as intended. In other embodiments of the present disclosure, the steps or queries of the algorithm for customizing an indicator light of a printing device may be prioritized in various orders within the purview of one skilled in the art.

In a first step 210, the algorithm 200 continuously monitors the current machine state of the printing device. In steps 220 and 225, if the current machine state as detected by the algorithm 200 is OFF, the indicator light receives no power and, thus, remains OFF until the algorithm 200 detects a machine state other than OFF. That is, if the printing device is off or in a so-called "sleep mode," power to the indicator light is off and, thus, the indicator light must be off.

In step 230, if the machine state is STOPPED/FAULTED and the corresponding user setting is not set to SKIP, the indicator light is activated in accordance with the user setting corresponding to STOPPED/FAULTED and the algorithm 200 enters step 240. If either the machine state is not STOPPED/FAULTED or the machine state is STOPPED/FAULTED and the corresponding user setting is set to SKIP, the algorithm 200 enters step 240. In step 240, if the machine state is NEEDS ATTENTION and the corresponding user setting is not set to SKIP, the indicator light is activated in accordance with the user setting corresponding to NEEDS ATTENTION and the algorithm 200 enters step 250. If either the machine state is not NEEDS ATTENTION or the machine state is NEEDS ATTENTION and the corresponding user setting is set to SKIP, the algorithm 200 enters step 250. In step 250, if the machine state is INFORMATIONAL and the corresponding user setting is not set to SKIP, the indicator light is activated in accordance with the user setting corresponding to INFORMATIONAL and the algorithm 200 enters step 260. If either the machine state is not INFORMATIONAL or the machine state is INFORMATIONAL and the corresponding user setting is set to SKIP, the algorithm 200 enters step 260. In step 260, if the machine state is PRINTING and the corresponding user setting is not set to SKIP, the indicator light is activated in accordance with the user setting corresponding to PRINTING and the algorithm 200 enters step 270. If either the machine state is not PRINTING or the machine state is PRINTING and the corresponding user setting is set to SKIP, the algorithm 200 enters step 270. In step 270, if the machine state is IDLE and the corresponding user setting is not set to SKIP, the indicator light is activated in accordance with the user setting corresponding to IDLE and the algorithm 200 enters step 280. If either the machine state is not IDLE or the machine state is IDLE and the corresponding user setting is set to SKIP, the algorithm 200 enters step 280. In step 280, if the machine state is DEFAULT and the corresponding user setting is not set to SKIP, the indicator light is activated in accordance with the user setting corresponding to DEFAULT and the algorithm 200 returns to step 220. If either the machine state is not DEFAULT or the machine state is DEFAULT and the corresponding user setting is set to SKIP, the algorithm 200 returns to step 220.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A customizable indicator light system for a printing device comprising:
   at least one printing device configured to detect at least one machine state corresponding to the operation thereof and having an indicator light operably coupled thereto, the indicator light adapted to operate in at least one of an off state, a blink state, and a steady state to indicate the detected machine state; and
   a computing device in operative communication with the at least one printing device and adapted to provide at least one user setting to the at least one printing device, the at least one user setting including at least one behavior setting configured to selectively set the indicator light to one of the off state, the blink state, and the steady state based on the detected machine state and a skip setting configured to cause the indicator light to remain set in at least one of the off state, the blink state, and the steady state based on the detected machine state.

2. A customizable indicator light system according to claim 1, wherein the at least one behavior setting is one of an off setting, a blink setting, and a steady setting configured to set the indicator light to the off state, the blink state, and the steady state, respectively.

3. A customizable indicator light system according to claim 1, wherein the detected machine state is at least one of an OFF state, a STOPPED/FAULTED state, a NEEDS ATTENTION state, an INFORMATIONAL state, a PRINTING state, an IDLE state, and a DEFAULT state.

4. A customizable indicator light system according to claim 1, wherein the at least one printing device includes at least one system default setting stored therein, the at least one system default setting adapted to selectively change the state of operation of the indicator light based on the detected machine state.

5. A customizable indicator light system according to claim 3, wherein the at least one user setting is configured to selectively override the at least one system default setting.

6. A customizable indicator light system according to claim 1, wherein the at least one machine state is detected in accordance with a predetermined priority.

7. A customizable indicator light system according to claim 1, wherein the indicator light is a monochromatic LED.

8. A customizable indicator light system according to claim 1, wherein the at least one printing device includes an RFID interrogator configured to communicate with an REID transponder associated with a user to facilitate the transmission of the at least one user setting to the at least one printing device.

9. A customizable indicator light system according to claim 8, wherein the RFID transponder includes an identification code corresponding to a user associated with the RFID transponder, wherein transmission of the at least one user setting to the at least one printing device is restricted based on a comparison between the identification code of the RFID transponder and a database of RFID codes stored in the at least one printing device.

10. A customizable indicator light system for a printing device comprising:
   at least one printing device configured to detect at least one machine state corresponding to the operation thereof and having an indicator light operably coupled thereto, the indicator light adapted to operate in at least one of an off state, a blink state, and a steady state to indicate the detected machine state;
   a computing device in operative communication with the at least one printing device and adapted to provide at least one user setting to the at least one printing device, the at least one user setting including at least one behavior setting configured to selectively set the indicator light to one of the off state, the blink state, and the steady state based on the detected machine state and a skip setting configured to cause the indicator light to remain set in at least one of the off state, the blink state, and the steady state based on the detected machine state; and
   at least one system default setting stored in the printing device adapted to change the state of operation of the indicator light based on the detected machine state, wherein the at least one user setting is configured to selectively override the at least one system default setting.

11. A customizable indicator light system according to claim 10, wherein the at least one behavior setting is one of an off setting, a blink setting, and a steady setting configured to set the indicator light to the off state, the blink state, and the steady state, respectively.

12. A customizable indicator light system according to claim 10, wherein the detected machine state is at least one of an OFF state, a STOPPED/FAULTED state, a NEEDS ATTENTION state, an INFORMATIONAL state, a PRINTING state, an IDLE state, and a DEFAULT state.

13. A method for customizing indicator light behavior of a printing system, the method comprising:
   generating at least one user setting having at least one behavior setting and a skip setting to at least one printing device;
   detecting at least one machine state of the at least one printing device;
   setting an indicator light to one of an off state, a blink state, and a steady state based on the detected machine state in accordance with the at least one behavior setting; and
   repeating the detecting step based on the detected machine state in accordance with the skip setting.

14. A method for customizing indicator light behavior of a printing system according to claim 13, wherein the at least one machine state is at least one of an OFF state, a STOPPED/FAULTED state, a NEEDS ATTENTION state, an INFORMATIONAL state, a PRINTING state, an IDLE state, and a DEFAULT state.

15. A method for customizing indicator light behavior of a printing system according to claim 13, further comprising monitoring the at least one machine state in accordance with a predetermined priority.

16. A method for customizing indicator light behavior of a printing system according to claim 13, wherein the at least one behavior setting is one of an off setting, a blink setting, and a steady setting configured to set the indicator light to the off state, the blink state, and the steady state, respectively.

17. A method for customizing indicator light behavior of a printing system according to claim 14, further comprising setting the indicator light to the off state if the at least one machine state is an OFF state until the at least one machine state is at least one of the STOPPED/FAULTED state, the NEEDS ATTENTION state, the INFORMATIONAL state, the PRINTING state, the IDLE state, and the DEFAULT state.

18. A method for customizing indicator light behavior of a printing system according to claim 13, further comprising storing the at least one user setting corresponding to a user of the printing system for subsequent retrieval therefrom by the user of the printing system.

19. A method for customizing indicator light behavior of a printing system according to claim 13, further comprising utilizing an RFID transponder to communicate the at least one user setting to an RFID interrogator in operative communication with the at least one printing device.

20. A method for customizing indicator light behavior of a printing system according to claim 19, further comprising restricting the communication of the at least one user setting based on a comparison between an identification code corresponding to a user associated with the RFID transponder and at least one identification code stored in the at least one printing device.

* * * * *